July 24, 1956
E. L. COLLINS
2,755,590
FISHING DEVICE
Filed May 18, 1953
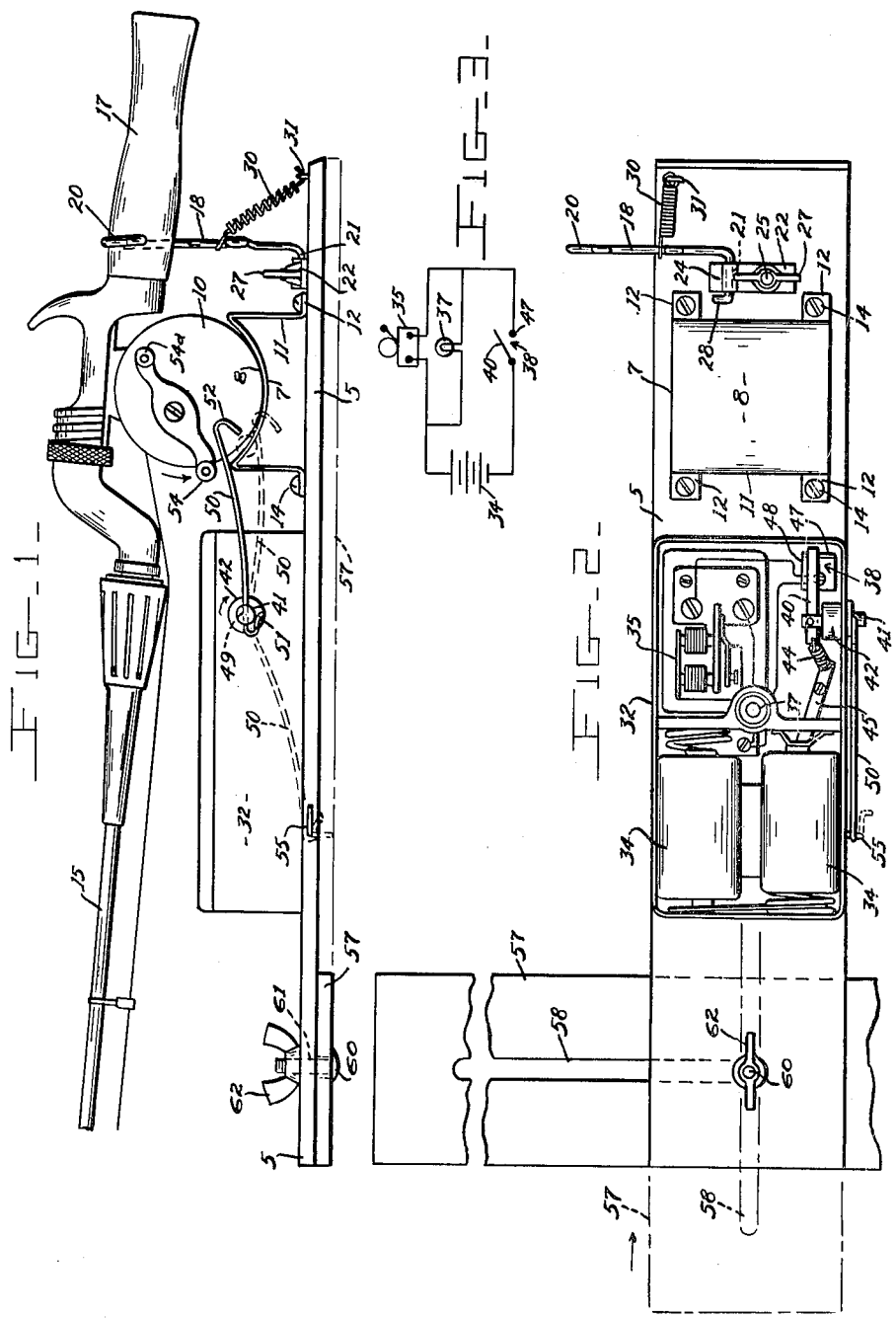
INVENTOR.
Earl L. Collins
BY D. Emmett Thompson
ATTORNEY

United States Patent Office 2,755,590
Patented July 24, 1956

2,755,590

FISHING DEVICE

Earl L. Collins, Camillus, N. Y.

Application May 18, 1953, Serial No. 355,723

2 Claims. (Cl. 43—17)

This invention relates to fishing equipment, and has particular reference to an improved rod and reel supporting device having signalling means to indicate to the fisherman when a fish has taken the line.

Heretofore, a variety of devices have been developed for supporting a fishing rod and for indicating to a fisherman, who may be otherwise occupied, that he has a "bite." Many of these devices, however, are of a complicated nature and frequently are in the way of the fisherman after he takes up the rod to play the fish. Others have proved to be too cumbersome to be carried about easily or involve a considerable amount of time and trouble to set up and take down.

The primary object of the present invention is to provide a greatly improved fishing rod and reel supporting device having bite signalling means, which device is compact and simple to use and does not have the drawbacks of similar devices heretofore developed.

A further object of the present invention is to provide a rod supporting and bite signalling device which is durable and reliable and yet is economical to manufacture.

A more specific object of the invention is to provide a rod supporting and bite signalling device whereby the rod may be quickly disconnected from the support when a bite has been signalled to enable the fisherman to play the fish.

A further specific object of the invention is to provide a rod and reel supporting device having bite signalling means which are actuated by the rotation of reel handle as the line is taken by a fish.

Other objects and advantages of the invention will become apparent from the following detailed description read in conjunction with the accompanying drawings wherein like reference characters are used to designate like parts in all the views.

Figure 1 is a side elevation of a typical embodiment of the fishing device of the invention with a fishing rod and reel mounted thereon.

Figure 2 is a top plan view of the device shown in Figure 1.

Figure 3 is a wiring diagram of the electrical circuit for the signalling means of the device shown in Figure 1.

Having reference now to the drawings, wherein a typical embodiment of the fishing device is shown for the purposes of describing the invention, 5 indicates a base support member of any suitable rigid material such as wood or plastic. Mounted on the base 5 is a reel support bracket 7, the top of which is formed into a concave cylindrical surface 8 to substantially conform to the periphery of a conventional fishing reel 10. The side walls 11 of the bracket are provided at their lower edges with feet or lugs 12 which are secured to the base as by screws 14.

The reel 10 is mounted in the ordinary manner on a fishing rod 15 having a handle portion 17. Where the assembled rod and reel are positioned on the device with the reel 10 resting in bracket 7, the rod is maintained in position and at the proper angle by means of a quickly releasable rod handle engaging member 18. One end portion of member 18 is formed with a hook 20 to engage the rod handle, and the other end portion thereof is turned at 90° to the plane of the hook to provide an axis 21 about which the hook can be pivoted. Member 18 is secured to the base 5 by means of a bracket 22 having a U-shaped offset portion 24 in which portion 21 is free to turn. The bracket is fastened to the base by some means such as a screw 25 and wing nut 27, and the end of the axis is turned as at 28 to retain it in the offset. This arrangement permits the hook 20 to be pivoted in a vertical plane perpendicular to the longitudinal axis of base 5. A tension spring 30 is secured between member 18 and an eye 31 on the base, and normally maintains the member in a horizontal position as shown in Figure 2. When the member is moved into vertical position to engage hook 20 with the rod handle, spring 30 is tensioned as shown in Figure 1.

The signalling means may be housed in a receptacle 32 suitably fastened to the base 5, forward of the reel bracket 7. The signalling means comprises a source of electrical power such as dry cells 34, a buzzer element 35, an electric light bulb 37 and a normally open switch 38. As best shown in the wiring diagram of Figure 3, the buzzer 35 and light 37 are connected in parallel to the source of power 34. The movable contact 40 of switch 38 is mounted on the inner end of a stud shaft 41 journalled in a boss 42 secured to receptacle 32. Contact 40 is held in a normally open position by a coil spring conductor 44 connected as by conducting strip 45 with the power source 34. To close the switch, contact 40 is moved into engagement with an upstanding arm 47 of contact terminal 48.

When the switch 38 is closed, the bulb 37 lights and the buzzer 35 sounds off. The receptacle 32 is preferably formed of translucent plastic material so that the light emitted will be visible therethrough. The receptacle can also, however, be formed of metal, wood or other opaque material in which case an aperture will be formed above the light bulb and provided with a suitable glass or lens to permit the light to be visible from the exterior of the receptacle. It will be understood, of course, that the signalling means need not include both a buzzer and light as disclosed herein for the purpose of the description, but can operate satisfactorily with either element alone if desired.

The outer end of stud shaft 41 is provided with a diametral bore 49 in which is positioned a thin rod or wire 50 having hooked ends 51, 52. Clockwise movement of wire 50 relative to the shaft 41, Figure 1, causes contact 40 to be moved into engagement with contact 47 and close the switch 38. The wire 50 is, therefore, an external resilient actuating arm for the signalling means. When the wire or arm is pulled rearwardly through the bore 49 until its left end 51 abuts stud shaft 41, the right end 52 thereof is positioned adjacent the reel supporting bracket 7 directly beneath a knob 54 on the reel winding handle as shown in Figure 1. Alternatively, the arm 50 may be pulled forwardly through bore 49 until its right end 52 abuts the stud shaft and its left end 51 engages a hook 55 mounted in the side of the base 5. In this latter position, the arm can not be rotated or otherwise moved to actuate the signalling means.

The base support member 5 is provided with an adjustable extension element 57 which normally underlies the member and has substantially the same dimensions thereof. Element 57 is formed with a longitudinal slot 58, and is secured to the base as by a screw 60 which passes through the slot and a bore 61 in the base, a wing nut 62 being threaded onto the end of the screw as shown. By loosening wing nut 62, the extension element 57 may be moved forwardly relative to the base 5 and then pivoted on the screw 60 so that its longitudinal axis is at right angles to the long axis of the base and it extends outwardly equal distances on either side of the base. In this manner the base and extension element provide a steady three-point support whether the device is set up on a relatively rough lake shore or the smooth deck of a boat.

In carrying the device, the extension element 57 will be positioned in alignment with the base 5 and the actuating arm 50 will be pulled forwardly and secured to the hook 55, as indicated in phantom lines in Figure 1, so that the device is in compact form and its signalling means can not be accidentally actuated as by jarring due to automobile travel. At the fishing site, the device is set up by extending the element 57 as above described to give firm three-point support, and pulling the actuating arm 50 rearwardly to its operating position as shown in solid lines in Figure 1. The assembled rod and reel are then positioned on the device with the reel 10 resting in its support bracket 7 and the hook 20 in engagement with the handle portion 17 of the rod. The line is then baited and thrown into the water in the usual manner. When a fish takes the line and starts away, the line pays out from the reel causing the reel handle to rotate in a counter-clockwise direction as indicated by the arrow, Figure 1. As the reel handle rotates, knob 54 hits the actuating arm 50 and moves it in a clockwise direction causing the switch 38 to close as above described. When the reel handle has moved to a vertical position, knob 54 slips off arm 50 and the latter springs upwardly for engagement by the opposite knob 54a as it comes around. In this manner, switch 38 is intermittently closed and opened causing a flashing light and recurrent buzzing which indicates to the fisherman that the has a bite. In order to release the rod so that the can play the fish and land it, the fisherman need only depress the end of the rod handle portion 17 which allows the spring 30 to retract the handle engaging member 18 and return it to its horizontal position as shown in Figure 2. In this manner, the fisherman is instantly warned when a fish takes the line, and can release the rod from the device and pick it up in substantially the same motion.

What I claim is:

1. A fishing device comprising an elongated base plate, a supporting plate positioned at the forward end of the base plate, a fastening member extending through said plates, said supporting plate being movable about said fastening member from a position in alignment with the base plate to a position transverse thereto, a bracket mounted on the rear portion of the base plate for receiving and supporting the reel of a fishing rod with the rod extending lengthwise of the base plate, a releasable spring biased rod handle engaging member carried by the base plate, a closed receptacle mounted on the intermediate portion of the base plate, a signal element, and a source of electric power arranged in the receptacle, a circuit including a switch mounted within the receptacle and connecting said signal element with said source of power, a switch actuating shaft journalled in said receptacle and having a portion extending exteriorly of said receptacle, and an actuating arm carried by the extending portion of said shaft and adapted to be engaged by the reel handle when the line is played out from the reel to rotate said shaft to close said switch and energize the signal element.

2. A fishing device as defined in claim 1, wherein said actuating arm is formed of resilient material and is slidably mounted in said shaft for movement transversely thereof into or out of reel engaging position, and means for holding said arm against movement when the same is shifted out of reel engaging position.

References Cited in the file of this patent

UNITED STATES PATENTS

| 1,520,556 | Beckwith | Dec. 23, 1924 |
| 1,876,478 | Van Duzer | Sept. 6, 1932 |
| 2,502,231 | Oberg | Mar. 28, 1950 |
| 2,599,099 | Folker | June 3, 1952 |
| 2,645,050 | Golias | July 14, 1953 |